April 28, 1925.
G. M. LUDLOW
1,535,426
THERMOSTATIC SUPPORT FOR SCALE SPRINGS
Filed Jan. 2, 1923
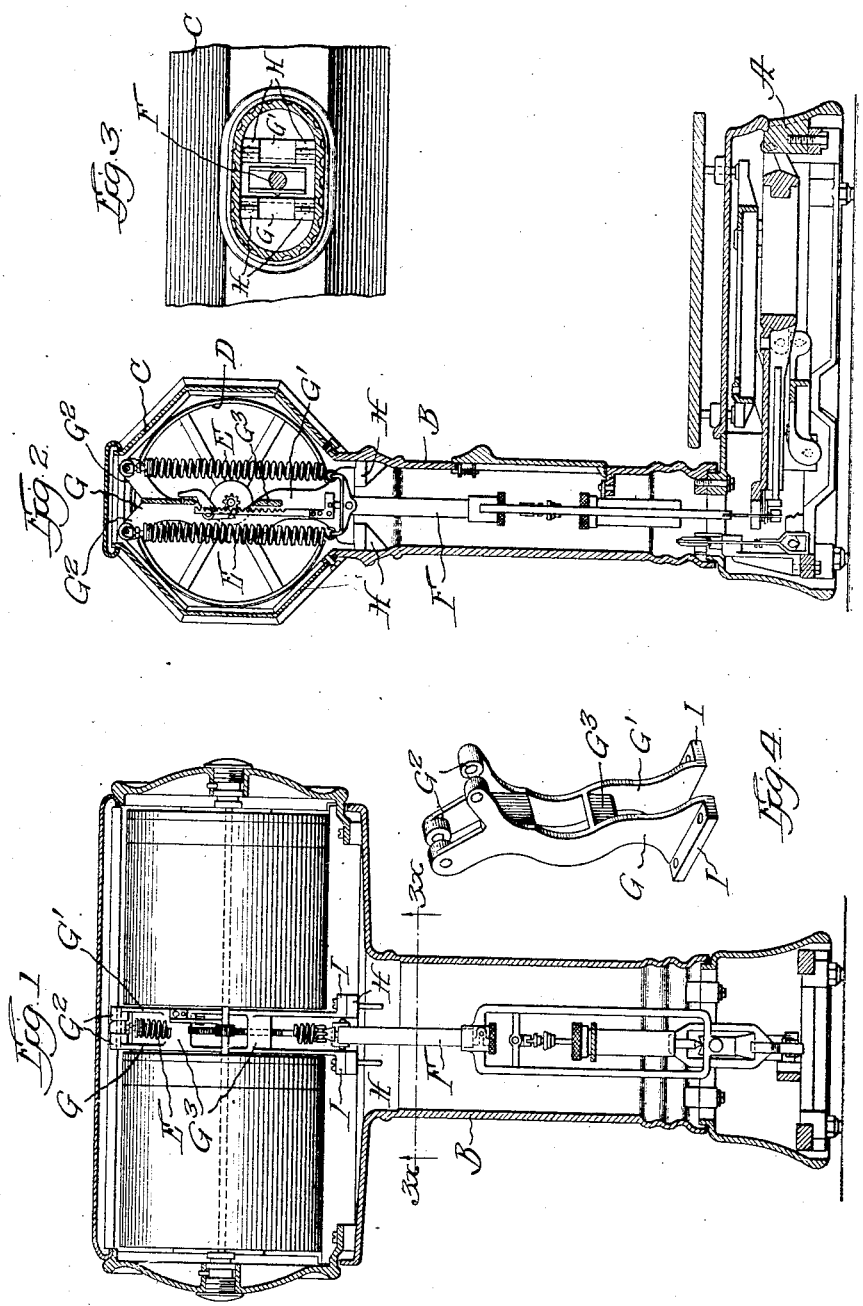
Witness:
Inventor:
George M. Ludlow
By Wilkinson, Huxley, Byron & Knight
Attys.

Patented Apr. 28, 1925.

1,535,426

UNITED STATES PATENT OFFICE.

GEORGE M. LUDLOW, OF EVANSTON, ILLINOIS, ASSIGNOR TO SANITARY SCALE COMPANY, OF CHICAGO, ILLINOIS, A CORPORATION OF ILLINOIS.

THERMOSTATIC SUPPORT FOR SCALE SPRINGS.

Application filed January 2, 1923. Serial No. 610,208.

*To all whom it may concern:*

Be it known that I, GEORGE M. LUDLOW, a citizen of the United States, residing at Evanston, in the county of Cook and State of Illinois, have invented certain new and useful Improvements in Thermostatic Supports for Scale Springs, of which the following is a specification.

This invention relates to weighing scales of the class in which a load is counterbalanced by suitably calibrated springs, and in which the means for supporting the counterbalancing spring or springs is thermostatically adjusted to compensate for changes in spring length resulting from variations in atmospheric temperature.

The object of the invention is to provide a thermostatic support for the springs of spring-balance scales which will be very much more accurate and positive than thermostatically adjusted supports heretofore employed, and one which will be particularly adapted to enter into a scale organization having the counterbalancing springs supported above the loading mechanism through the medium of a column through which the weighing connections extend.

Accordingly, the invention consists in a support for the counterbalance springs of scales, which consists in a column comprising a pillar rising from the base in which the loading mechanism is arranged, and a standard supported by and upstanding from the upper portion of the pillar, in alinement with the pillar, and having the counterbalance springs depending from its upper end in a position to receive the weighing connections which extend downwardly through the pillar to the loading mechanism; the standard being constructed of a material having a thermostatic coefficiency which renders the entire column substantially corrective of variations in the spring length due to changes in temperature.

The invention is illustrated in the accompanying drawing, in which—

Figure 1 is a vertical section of a rotary chart scale in which the invention is embodied, the section being in the plane of the axis of the rotary chart.

Figure 2 is a vertical section in a plane central to Figure 1,

Figure 3 is a section taken on the line $3^x$—$3^x$ of Figures 1 and 2 and looking upwardly; and Figure 4 is a perspective view of the standard constructed of thermostatic material.

A represents the base of a scale containing loading mechanism, B the upright pillar supported on the base and containing load-transmitting connections, and C represents a housing containing a rotary chart D upon which the weighing effects are read. In order to counterbalance the load of the scale and measure the same, springs E are interposed between the weighing connections F and the upper end of a suitable support or column. According to the present invention, this support comprises a standard G, which is mounted upon and is upstanding from the pillar B, being sustained on the latter through means of a plurality of symmetrically distributed brackets or steps H that receive correspondingly positioned feet I on the bottom of the standard, thus holding the standard and pillar in vertical alinement, so that they constitute a vertically continuous spring supporting column having the inherent condition of longitudinal self adjustment in compensation for variations in the length of the spring, under the influence of temperature changes. The standard as preferably designed consists essentially of vertical cheek plates G' terminating in the oppositely directed suspending horns $G^2$, said cheek plates being connected at intervals by webs $G^3$, as set forth in application Serial No. 537,315 previously filed by the same inventor.

The standard G and its several parts are made of a material, preferably a metal alloy, having a high coefficiency of expansion and contraction under changes in atmospheric temperature and sufficient to compensate for changes in the length of the springs E.

I claim:

1. In a spring balanced scale, a base, a pillar upstanding from said base, a chart housing supported upon the upper end of said pillar, a chart having bearings in said housing, said housing constituting a supporting frame for the chart, a standard in vertical alignment with said pillar, mounted upon the pillar independently of the chart-supporting frame, and counterbalancing springs suspended from the upper end of said standard; said standard being of a material having a thermostatic coefficiency which renders the standard substantially corrective of variation in the dimension of the springs resulting from changes in temperature.

2. In a spring-balance scale, a counterbalancing spring, and a supporting column from the upper end of which said spring is suspended, comprising a pillar and a standard mounted upon and upstanding from and in vertical alinement with said pillar and constructed of material having a thermostatic coefficiency which renders the standard substantially corrective of variations in the dimension of the spring resulting from changes in temperature; said pillar being of hollow construction and having a plurality of steps receiving said standard at points symmetrically disposed about the walls of said pillar.

3. In a spring-balance scale, a spring-supporting column, and a plurality of counterbalancing springs suspended from the upper end of said column and symmetrically distributed in relation to the column; said column comprising a pillar of material having a relatively low coefficiency of heat expansion and a single standard mounted upon and upstanding from said pillar, serving in common for suspension of said springs and constructed of material having a coefficiency of expansion sufficiently high to lend to the column thermostatic correction equivalent to variations in the length of the spring resulting from changes in temperature; said pillar being of hollow construction, with a plurality of symmetrically disposed steps; said standard resting upon said steps and standing centrally over the pillar; said springs depending on opposite sides of said standard; and there being within said pillar a steelyard rod connected with the springs below the standard.

Signed at Chicago, Illinois, this 30th day of December, 1922.

GEORGE M. LUDLOW.